United States Patent [19]

Tomita et al.

[11] Patent Number: 4,883,226
[45] Date of Patent: Nov. 28, 1989

[54] HEATER DEVICE FOR MOTOR VEHICLE

[75] Inventors: Itizo Tomita, Konan; Takehide Matsumoto, Higashi-matsuyama, both of Japan

[73] Assignee: Diesel Kiki Co., Ltd., Tokyo, Japan

[21] Appl. No.: 227,252

[22] Filed: Aug. 2, 1988

[30] Foreign Application Priority Data

Aug. 12, 1987 [JP] Japan ............ 62-201391

[51] Int. Cl.⁴ .............................. B60H 1/02
[52] U.S. Cl. ................ 237/12.3 C; 237/12.3 A; 237/12.3 B
[58] Field of Search ............ 237/12.3 C, 12.3 B, 237/12.3 R, 12.3 A; 137/625.19, 625.47

[56] References Cited

U.S. PATENT DOCUMENTS 2,256,511 8/1939 Amen ..................... 137/625.19
2,637,342 5/1953 Shannon ................. 137/625.19

FOREIGN PATENT DOCUMENTS 62-12411 1/1987 Japan.

Primary Examiner—Henry A. Bennet
Assistant Examiner—John Sollecito
Attorney, Agent, or Firm—Wenderoth, Lind & Ponack

[57] ABSTRACT

In a heater device for motor vehicles of the type in which engine cooling water is supplied from one or both of an engine and a combustion heater to a heater core for heating the passenger compartment of a motor vehicle, a directional control valve with four distinct directions is disposed in a supply conduit of a circulation circuit extending between the engine and the heater core. The directional control valve includes a valve box having four intake and discharge ports, and a rotary spool disposed in the valve box and having a radial straight hole interconnecting a diametrically opposite pair of the intake and discharge ports and an arcuate peripheral recess connecting adjacent two of the intake and discharge ports.

3 Claims, 3 Drawing Sheets

HEATER DEVICE FOR MOTOR VEHICLE

BACKGROUND OF THE INVENTION

1. Field of the Invention

The present invention relates to a heater device for motor vehicles, and more particularly to an automotive heater device having a heating circuit combined with an engine cooling water circulation circuit and incorporating a combustion heater.

2. Prior Art

Japanese Patent Laid-open Publication No. 62-12411 discloses a heater device for motor vehicles of the type which includes a circulation circuit for circulating engine cooling water through a heater core disposed in the passenger compartment of a motor vehicle, and a combustion heating circuit combined with the circulation circuit for heating the engine cooling water by a combustion heater.

The supply of engine cooling water to the combustion heating circuit is controlled by a directional control valve with four ports and four distinct directions in the manner described below. An engine needs a relatively long warming-up when started in a cold area. In this instance, the engine cooling water is circulated exclusively between the combustion heating circuit and the heater core to thereby elevate the temperature of the passenger compartment rapidly Such circulation of engine cooling water is also performed when an occupant of the passenger compartment takes a nap while the engine is being stopped, thereby saving the overall fuel consumption.

While the engine is operating at a predetermined temperature, the supply of engine cooling water to the combustion heating circuit is interrupted and the engine cooling water is supplied directly to the heater core.

The directional control valve incorporated in the known automotive heater device includes, as reillustrated here in FIG. 8, a second discharge conduit A for supplying the engine cooling water to the combustion heater, a second intake conduit B for receiving the engine cooling water flowing from an engine radiator, a first discharge conduit C for supplying the engine cooling water to the engine radiator, and a first intake conduit D for receiving the engine cooling water from the engine, the conduits A–D being arranged in the order named and angularly spaced at equal intervals. The directional control valve includes a rotary spool F having an arcuate internal hole E.. The arcuate hole E serves to interconnect two adjacent conduits A–D for changing the path of circulation of the engine cooling water. For example, when the first intake conduit D and the second discharge conduit A are connected together, the engine cooling water is circulated successively through the engine, the combustion heater and the engine radiator. Likewise, when the second discharge conduit A is brought into fluid communication with the second intake conduit B, the engine cooling water is circulated exclusively between the combustion heater and the engine radiator. Yet, the engine cooling water is circulated exclusively between the engine and the engine radiator when the first intake conduit D and the first discharge conduit C are connected together.

The known heater device having such directional control valve is disadvantageous in that the arcuate connecting hole or passage E in the rotary spool F has a greater flow resistance than a straight passage and hence tends to lower the flow quantity of engine cooling water flowing therethrough. With this reduced flow quantity, the heating ability or power of the known heater device is relatively low.

SUMMARY OF THE INVENTION

In view of the foregoing drawbacks in view, an object of the present invention is to provide a heater device for motor vehicles which has a relatively large heating power.

To achieve the foregoing object, there is provided according to the present invention a heater device for motor vehicles wherein engine cooling water is supplied to a heater core from at least one of an engine and a combustion heater for heating the passenger compartment of a motor vehicle, the heater device comprising:

a circulation circuit for circulating the engine cooling water between the engine and the heater core, including a supply conduit for the passage therethrough of the engine cooling water flowing from the engine to the heater core, and a return conduit for the passage therethrough of the engine cooling water flowing from the heater core to the engine;

a bypass circuit branched off from the supply conduit for bypassing the engine cooling water to the combustion heater, the bypass circuit including a supply pipe for introducing the engine cooling water from the supply conduit to the combustion heater for heating the engine cooling water, and a return pipe for returning the thus-heated engine cooling water from the heater core to the supply conduit; and a directional control valve with four distinct directions disposed at a junction between the supply conduit and the supply pipe for changing the path of flow of the engine cooling water, the directional control valve including a valve box and a rotary spool disposed therein, the valve box having a first intake port connected with a part of said supply conduit leading to the engine, a first discharge port connected with a part of the supply conduit leading to the heater core and disposed in confronting relation to the first intake port, a second intake port connected with an intermediate portion of the return conduit, and a second discharge port connected with the supply pipe and disposed in confronting relation to the second intake port, the rotary spool having a straight hole for interconnecting a diametrically opposite pair of the intake and discharge ports and an arcuate peripheral recess for connecting adjacent two of the intake and discharge ports.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Certain preferred embodiments of the present invention will be described hereinbelow in detail with reference to the accompanying drawings.

Figure 1:
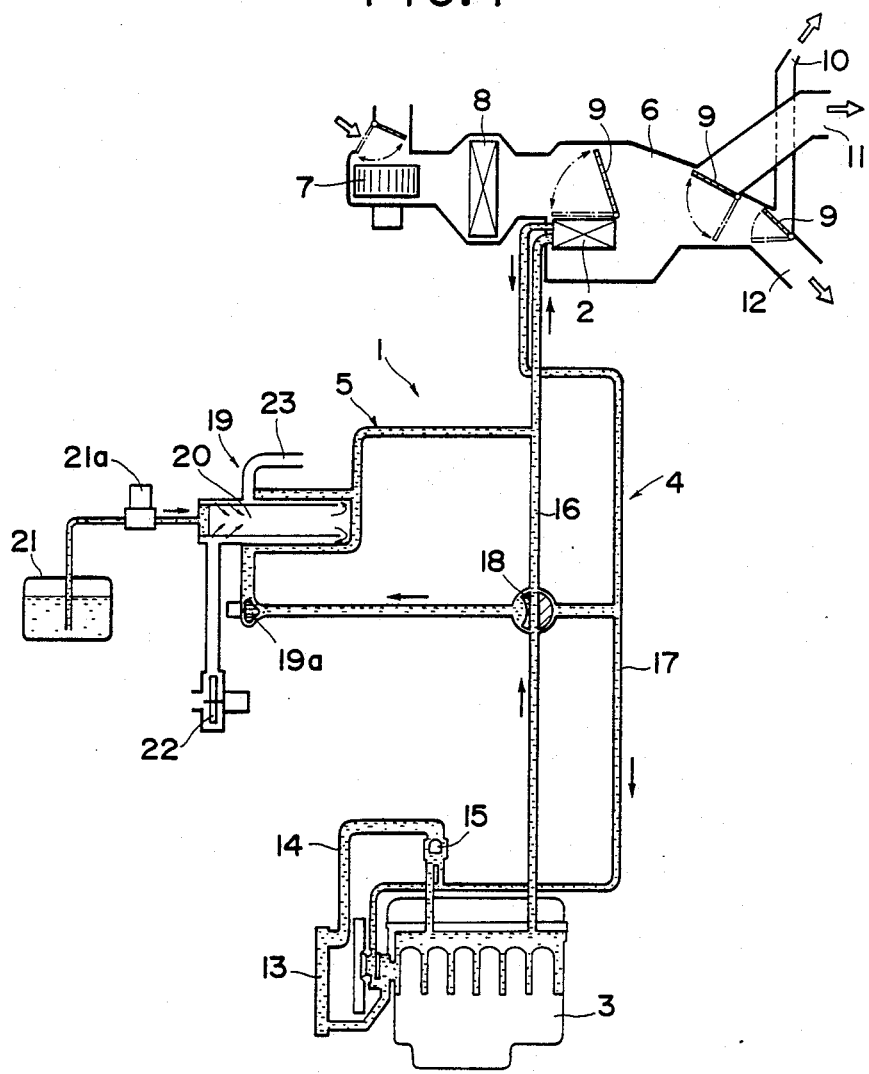
FIG. 1 is a diagrammatical view showing the general construction of an automotive heater device according to the present invention.

As shown in FIG. 1, a heater device 1 for motor vehicle includes a heater core 2 for radiating heat taken from the heated engine cooling water to the passenger compartment of a motor vehicle, a circulation circuit 4 for circulating the engine cooling water between an engine 3 and the heater core 2, and a combustion heating circuit 5 combined midway with the circulation circuit 4 for heating the engine cooling water by combustion heat.

The heater core 2 is disposed in a case 6 of an air conditioner unit installed in the passenger compartment for heating air at a predetermined temperature by subjecting the air to heat-exchanging relationship to the engine cooling water while the air and cooling water are flowing through the heater core 2. In the case 6, there is disposed a blower 7 for forcing air toward the heater core 2, an evaporator 8 for cooling the air, and a plurality of dampers 9 for controlling the flow of air in the case 6. The case 6 has a defrost air outlet 10, an upper air outlet 11 for directing air toward the face of an occupant and a lower air outlet 12 for directing air toward the feet of the occupant.

The engine 3 includes a circulation circuit 14 extending between the engine 3 and an engine radiator 13 for circulating a part of the engine cooling water through the engine radiator 13. The circulation circuit 14 for the radiator 13 includes a valve 15 for controlling the supply of engine cooling water from the engine 3 to the circulation circuit 14 in such a manner that the engine cooling water is automatically fed through the circulation circuit 14 to the engine radiator 13 when the temperature of engine cooling water reaches a predetermined value.

The circulation circuit 4 includes a supply conduit 16 for introducing a part of the engine cooling water from the engine 3 to the heater core 2 and a return conduit 17 for returning the engine cooling water from the heater core 2 to the engine 3. A directional valve 18 with four distinct directions is disposed in an intermediate portion of the supply conduit 16 for changing the path of flow of the engine cooling water to the combustion heating circuit 5.

The combustion heating circuit 5 includes a combustion heater 19 and a pump 19a disposed upstream of the combustion heater 19 for supplying thereto the engine cooling water for heating the same. The combustion heater 19 includes a burner 20, a fuel tank 21, a fuel pump 21a for supplying fuel from the tank 21 to the burner 20, and a blower 22 for supplying air to the burner 20. The combustion gas is exhausted from an exhaust pipe 23. The heated engine cooling water is returned to a portion of the supply conduit 16 which extends between the heater core 2 and the directional control valve 18.

Figure 2:
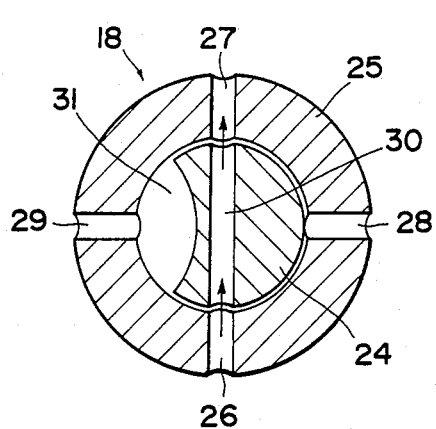
FIGS. 2 through 4 are transverse cross-sectional views showing various positions of a directional control valve of the heater device of FIG. 1.
Figure 3:
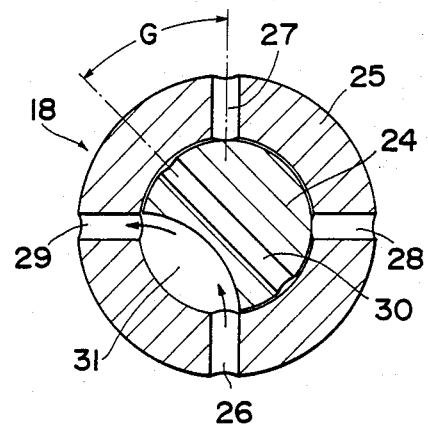
Figure 4:
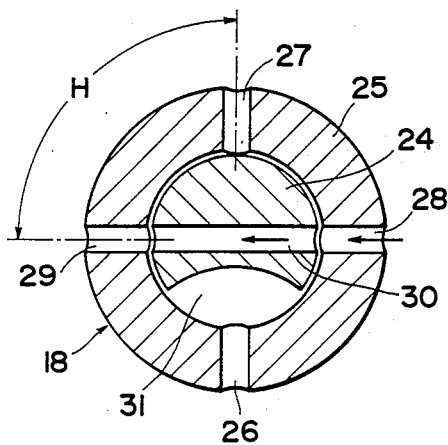

The directional control valve 18, as shown in FIGS. 2 through 4, includes a valve element in the form of a cylindrical rotary spool 24 of a circular cross section received in a valve box 25. The valve box 25 has a first intake port 26 for receiving the engine cooling water from the engine 3 and a first discharge port 27 for supplying engine cooling water to the heater core 2, the first intake and discharge ports 26, 27 being disposed in diametrically opposite relation to one another. . When the first intake port 26 and the first discharge port 27 are connected together by the rotary spool 18, the engine cooling water is supplied from the engine 3 directly to the heater core 2 through the supply conduit 16. The valve box 25 further has a second intake port 28 connected to an intake pipe branched off from a portion of the return conduit 17 and a second discharge port 29 connected to a supply pipe of the combustion heating circuit 5, the second intake and discharge ports 28, 29 being disposed in confronting relation to one another in a plane perpendicular to a plane in which the first and second intake ports 26, 27 are disposed in confrontation.

The first intake port 26, the second discharge port 29, the first discharge port 27 and the second intake port 28 are disposed clockwise in the valve box 25 of the directional control valve 18 in the order named and are circumferentially spaced at equal intervals.

Figure 8:
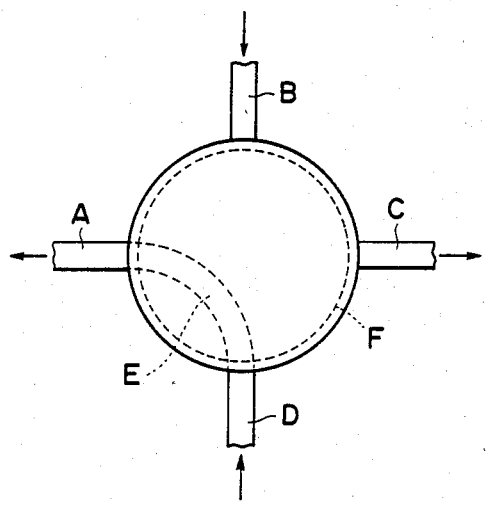
FIG. 8 is a schematic plan view of a conventional directional control valve with four distinct directions.

The rotary spool 24 of the directional control valve 18 has a radial straight connecting hole 30 extending diametrically across the spool 24 (that is, the radial hole 30 passes through the central axis of the spool 24), and an arcuate peripheral notch or recess 31 extending substantially parallel to the radial connecting hole 30. The radial connecting hole 30 is straight and hence can easily be formed by drilling. Likewise, the arcuate recess 31 can easily be formed by cutting off a peripheral portion of the spool 24. Consequently, the rotary spool 24 of the present invention can be manufactured easily at a low cost. On the contrary, the conventional spool F having an arcuate hole E as shown in FIG. 8 is difficult to construct and expensive to manufacture.

The rotary spool 24 is turned stepwise through a predetermined angle by properly energizing an electromagnet, not shown.

The heater device of the foregoing construction operates as follows: In case the outside temperature is not lower than a predetermined value, the combustion heater is kept in operative condition and the engine cooling water is circulated through the circulation circuit 4 during which time the engine cooling water is heated solely by the heat of the engine 3. In this instance, the spool 24 takes its position shown in FIG. 2 in which the first intake port 26 and the first discharge port 27 are connected together by the radial connecting hole 30, thereby permitting passage of the engine cooling water therethrough without being subjected to undue flow resistance in the directional control valve 18.

When the passenger compartment is to be heated as, soon as the engine 3 is started in a cold area, the engine cooling water flowing from the engine 3 is directed to the combustion heater 19 for being heated and thereafter supplied to the heater core 2. That is, the engine cooling water is heated by the engine 3 and the combustion heater 19. In this instance, as shown in FIG. 3, the rotary spool 24 is turned counterclokwise by one-eighth of one turn (namely, an angular range indicated by the arrow G) from the position of FIG. 2, thereby interconnecting the first intake port 26 and the second discharge port 29 through the arcuate peripheral recess 31. This flow path for the engine cooling water is maintained even after the engine cooling water reaches about 70° C. while a quick heating circuit is in operation as described later on. When the temperature of the engine cooling water is elevated to about 850° C., the fuel supply to the combustion heating circuit 5 is terminated as shown in FIG. 2.

When a rapid heating of the passenger compartment is desired under the condition that the temperature of engine cooling water is extremely low at the engine starting, or when the driver is desirous of taking a nap in the passenger compartment, the engine cooling water is circulated exclusively between the heater core 2 and the combustion heating circuit 5. With this circulation of the engine cooling water it is no longer necessary to operate the engine, and hence a substantial fuel saving is attained. In this instance, as shown in FIG. 4, the spool 24 is turned counterclockwise by one-fourth of one turn (namely, an angular range indicated by the arrow H) from the position of FIG. 2, thereby interconnecting the second intake port 28 and the second discharge port 29 in series with each other. The second intake and discharge ports 28, by the radial straight hole 30, 29 are connected together by the radial straight hole 30, and the engine cooling water is not subjected to a substantial flow resistance in the directional control valve 18.

As described above, the spool 24 is turned through an angle equal to one-fourth of one turn so as to take the position of FIG. 4 from the initial position shown in FIG. 2. In contrast to the spool 24 of the invention, the spool F of the conventional directional control valve needs to be turned from the initial position by three-fourths of one turn in order to communicate the second intake pipe B and the first discharge pipe C, as evidenced from FIG. 8. Consequently, the spool 24 of the present invention can be controlled quickly by a small-sized or compact electromagnetic device.

The heater device is most frequently operated in a heating mode in which the engine cooling water is circulated exclusively between the heater core 2 and the engine 3, or a heating mode in which the combustion heater 19 is used. In both heating modes, the engine cooling water flows through the directional control valve 18 along the radial straight hole 30 and therefore a pressure loss at the directional control valve 18 can be reduced.

Figure 5:
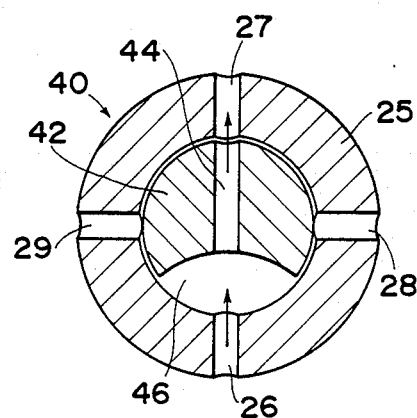
FIGS. 5 through 7 are views similar to FIGS. 2 through 4, respectively, but showing a modified directional control valve.
Figure 6:
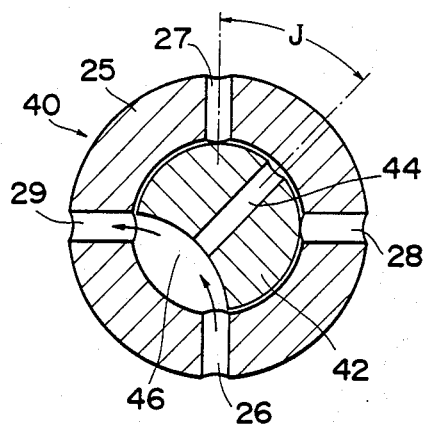
Figure 7:
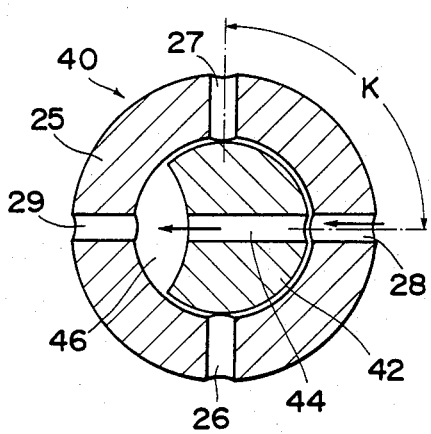

FIGS. 5-7 show a modified directional control valve 40 according to the present invention. The modified directional control valve 40 includes a rotary spool 42 having a radial straight hole 44 opening at its one end to the bottom of an arcuate peripheral recess 46. Other structural details of the directional control valve 40 are the same as those of the directional control valve 18 of the foregoing embodiment and hence the corresponding parts are designated by the same reference characters.

As shown in FIG. 5, when the first intake port 26 and the first discharge port 27 are connected together, the arcuate peripheral recess 46 is held in registry with the first intake port 26 and the radial straight hole 44 is held in registry with the first discharge port 27.

When the first intake port 26 is to be connected with the second discharge port 29 as shown in FIG. 6, the spool 42 is turned clockwise from the initial position of FIG. 5 by an angle equal to one-eighth of one turn, as indicated by arrow J, thereby interconnecting the first intake port 26 and the second discharge port 29 through the arcuate peripheral recess 46.

When the second intake port 28 and the second discharge port 29 are to be connected together as shown in FIG. 7, the spool 42 is turned clockwise from the initial position of FIG. 5 by one-fourth of one turn, thereby arranging the second intake port 28, the radial straight hole 44, the arcuate peripheral recess 46 and the second discharge port 29 in alignment with one another in the order named.

The various advantageous effects achieved by the first embodiment as stated above can also be attained by the second embodiment.

Obviously, various modifications and variations of the present invention are possible in the light of the above teaching. It is therefore to be understood that within the scope of the appended claims the invention may be practiced otherwise than as specifically described.

What is claimed is:

1. A heater device for a motor vehicle having an engine wherein cooling water is used for heating the passenger compartment of the motor vehicle, said heater device comprising:

a heater core for exchanging heat between the engine cooling water and air going to the passenger compartment of the motor vehicle;

a circulation circuit for circulating the engine cooling water between the engine and said heater core, said circulation circuit having a supply conduit adapted to be connected to the engine for supplying therethrough the engine cooling water from the engine to said heater core and a return conduit adapted to be connected to the engine for returning therethrough the engine cooling water from said heater core to the engine;

a combustion heater for heating the engine cooling water;

a bypass circuit branching off from said supply conduit for bypassing the engine cooling water to said combustion heater, said bypass circuit having a supply pipe for supplying the engine cooling water from said supply conduit to said combustion heater for heating the engine cooling water and a return pipe for returning the engine cooling water heated by said combustion heater to said supply conduit; and a directional control valve for changing the flow path of the engine cooling water, said directional control valve comprising a valve box and rotary valve spool disposed in said valve box;

said valve box having a first intake port connected to a first portion of said supply conduit extending from the engine to said valve box, a first discharge port connected to a second portion of said supply conduit extending from said valve box to said heater core, said first discharge port disposed diametrically opposite and in confronting relation to said first intake port, a second intake port connected to said return conduit, and a second discharge port connected to said supply pipe, said second discharge port disposed diametrically opposite and in confronting relation to said second intake port;

said intake and discharge ports in said valve box equally circumferentially spaced about said valve box with respect to each other; and said rotary valve spool having a radial straight hole extending therethrough passing through the central axis of said rotary valve spool for interconnecting said diametrically opposite intake and discharge ports and an arcuate peripheral recess extending over one-fourth of the entire circumference of said rotary valve spool for connecting two adjacent said ports.

2. The heater device according to claim 1, wherein said radial straight hole and said arcuate peripheral recess extend substantially parallel to each other.

3. The heater device according to claim 1, wherein said radial straight hole opens at one end thereof into said arcuate peripheral recess.

* * * * *